(12) United States Patent
Sakai

(10) Patent No.: US 12,030,147 B2
(45) Date of Patent: Jul. 9, 2024

(54) ROBOT MACHINING SYSTEM

(71) Applicant: FANUC CORPORATION, Yamanashi (JP)

(72) Inventor: Tamotsu Sakai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 1071 days.

(21) Appl. No.: 16/362,422

(22) Filed: Mar. 22, 2019

(65) Prior Publication Data

US 2019/0299350 A1 Oct. 3, 2019

(30) Foreign Application Priority Data

Mar. 27, 2018 (JP) .................................. 2018060379

(51) Int. Cl.
*B23Q 15/12* (2006.01)
*B23Q 15/08* (2006.01)
(Continued)

(52) U.S. Cl.
CPC ............. *B23Q 15/12* (2013.01); *B23Q 15/08* (2013.01); *B25J 9/06* (2013.01); *B25J 9/1664* (2013.01);
(Continued)

(58) Field of Classification Search
CPC .... B25J 9/1664; B25J 15/0095; B25J 13/085; B25J 9/1633; B25J 9/009; B25J 9/1682;
(Continued)

(56) References Cited

U.S. PATENT DOCUMENTS

| 4,332,066 A | * | 6/1982 | Hailey | ................... B23Q 35/02 |
| | | | | 901/41 |
| 5,243,266 A | | 9/1993 | Kasagami et al. | |

(Continued)

FOREIGN PATENT DOCUMENTS

DE S9217420 T2 9/1997
DE 202010005313 U1 10/2011
(Continued)

OTHER PUBLICATIONS

Notice of Reasons for Refusal dated Apr. 21, 2020, for Japanese Patent Application No. 2018060379.
(Continued)

*Primary Examiner* — Stephen Holwerda
(74) *Attorney, Agent, or Firm* — KARCESKI IP LAW, PLLC

(57) ABSTRACT

A robot machining system including: a robot in which a hand is attached to a distal end of an arm thereof; a force sensor provided in one of the robot and the machining device and detecting a force acting therebetween when a workpiece is being machined; and a control device that controls the robot or the machining device according to the detected force, wherein one of the machining device and the hand is provided with guide surfaces that extend along a direction in which the machining device and the hand are relatively moved when the workpiece is machined; the other of the machining device and the hand is provided with guided portions that are brought into contact with the guide surfaces when the workpiece is machined; and the control device performs control for maintaining a contact state between the guide surfaces and the guided portions during machining of the workpiece.

15 Claims, 7 Drawing Sheets

(51) Int. Cl.
  *B25J 9/06*    (2006.01)
  *B25J 9/16*    (2006.01)
  *B25J 11/00*   (2006.01)
  *B25J 13/08*   (2006.01)
  *G05B 19/416*  (2006.01)

(52) U.S. Cl.
  CPC ......... *B25J 11/0055* (2013.01); *B25J 13/085* (2013.01); *G05B 19/4166* (2013.01); *G05B 2219/50326* (2013.01)

(58) Field of Classification Search
  CPC ........ B25J 11/0055; B25J 9/06; B25J 11/005; B23Q 15/08; B23Q 15/12; G05B 19/4166; G05B 2219/39198; G05B 2219/50326; G05B 2219/39129
  See application file for complete search history.

(56) References Cited

U.S. PATENT DOCUMENTS

| | | | | |
|---|---|---|---|---|
| 5,254,923 | A * | 10/1993 | Kanitani | B25J 9/009 901/1 |
| 5,353,386 | A * | 10/1994 | Kasagami | B25J 9/1682 700/262 |
| 2006/0039768 | A1 | 2/2006 | Ban et al. | |
| 2006/0069466 | A1 | 3/2006 | Kato et al. | |
| 2008/0114492 | A1* | 5/2008 | Miegel | B25J 9/1664 901/6 |
| 2008/0297092 | A1* | 12/2008 | Nihei | B25J 9/1638 318/568.22 |
| 2009/0025199 | A1* | 1/2009 | Hariki | B25J 9/1682 29/430 |
| 2011/0200406 | A1* | 8/2011 | Lang | B23Q 7/047 409/137 |
| 2012/0197438 | A1 | 8/2012 | Ogami | |
| 2013/0037212 | A1 | 2/2013 | Maischberger | |
| 2013/0166071 | A1* | 6/2013 | Kranz | B25J 9/1633 29/559 |
| 2015/0104284 | A1 | 4/2015 | Riedel | |
| 2015/0234375 | A1 | 8/2015 | Takayama | |
| 2015/0352716 | A1 | 12/2015 | Sonehara et al. | |
| 2016/0332273 | A1 | 11/2016 | Furuya | |
| 2017/0008177 | A1* | 1/2017 | Ebihara | B25J 19/0075 |
| 2017/0050277 | A1 | 2/2017 | Shi et al. | |
| 2018/0104826 | A1* | 4/2018 | Kunisaki | B23Q 7/047 |
| 2018/0257230 | A1 | 9/2018 | Kinoshita et al. | |

FOREIGN PATENT DOCUMENTS

| | | |
|---|---|---|
| DE | 102015007516 A1 | 12/2015 |
| DE | 102016114863 A1 | 2/2017 |
| EP | 1628177 A2 | 2/2006 |
| EP | 1642690 A2 | 4/2006 |
| EP | 3351355 A1 | 7/2018 |
| JP | S5880153 U | 5/1983 |
| JP | S6025673 A | 2/1985 |
| JP | H0679568 A | 3/1994 |
| JP | 2001246528 A | 9/2001 |
| JP | 2006058961 A | 3/2006 |
| JP | 2015155126 A | 8/2015 |
| JP | 2016215359 A | 12/2016 |
| JP | 2017056535 A | 3/2017 |
| JP | 2017127932 A | 7/2017 |
| JP | 2017222010 A | 12/2017 |
| WO | 2014129524 A1 | 8/2014 |

OTHER PUBLICATIONS

Search Report by Registered Search Organization dated Mar. 24, 2020, for Japanese Patent Application No. 2018060379.
German Office Action dated Nov. 29, 2021, for German Patent Application No. 10 2019 106 756.1.

* cited by examiner

ROBOT MACHINING SYSTEM

CROSS-REFERENCE TO RELATED APPLICATIONS

This application is based on and claims priority to Japanese Patent Application No. 2018-060379, filed on Mar. 27, 2018, the entire content of which is incorporated herein by reference.

FIELD OF THE INVENTION

The present invention relates to a robot machining system.

BACKGROUND OF THE INVENTION

In the related art, there is a known machining system in which a workpiece is gripped by a hand attached to the distal end of a robot via a force sensor, and when performing machining by pressing the workpiece against a machining tool that is being rotated by a machining machine, the rotational speed of the machining tool and the workpiece feed rate of the robot are adjusted so that the force detected by the force sensor falls within a prescribed range (for example, see Japanese Unexamined Patent Application, Publication No. 2016-215359).

SUMMARY OF THE INVENTION

An aspect of the present invention is a robot machining system including: a robot in which a hand that grips a workpiece is attached to an arm end thereof; a machining device that rotationally drives a machining tool; a force sensor that is provided in at least one of the robot and the machining device and that detects a force acting between the robot and the machining device when the workpiece is being machined by the machining tool; and a control device that controls at least one of the robot and the machining device in accordance with the force detected by the force sensor, wherein one of the machining device and the hand is provided with guide surfaces that extend along a direction in which the machining device and the hand are relatively moved when the workpiece is machined by the machining tool, wherein the other of the machining device and the hand is provided with guided portions that are brought into contact with the guide surfaces when the workpiece is machined by the machining tool, and wherein the control device performs control for maintaining a contact state between the guide surfaces and the guided portions during machining of the workpiece by the machining tool.

DESCRIPTION OF EMBODIMENT(S) OF THE INVENTION

A robot machining system 1 according to an embodiment of the present invention will be described below with reference to the drawings.

Figure 1:
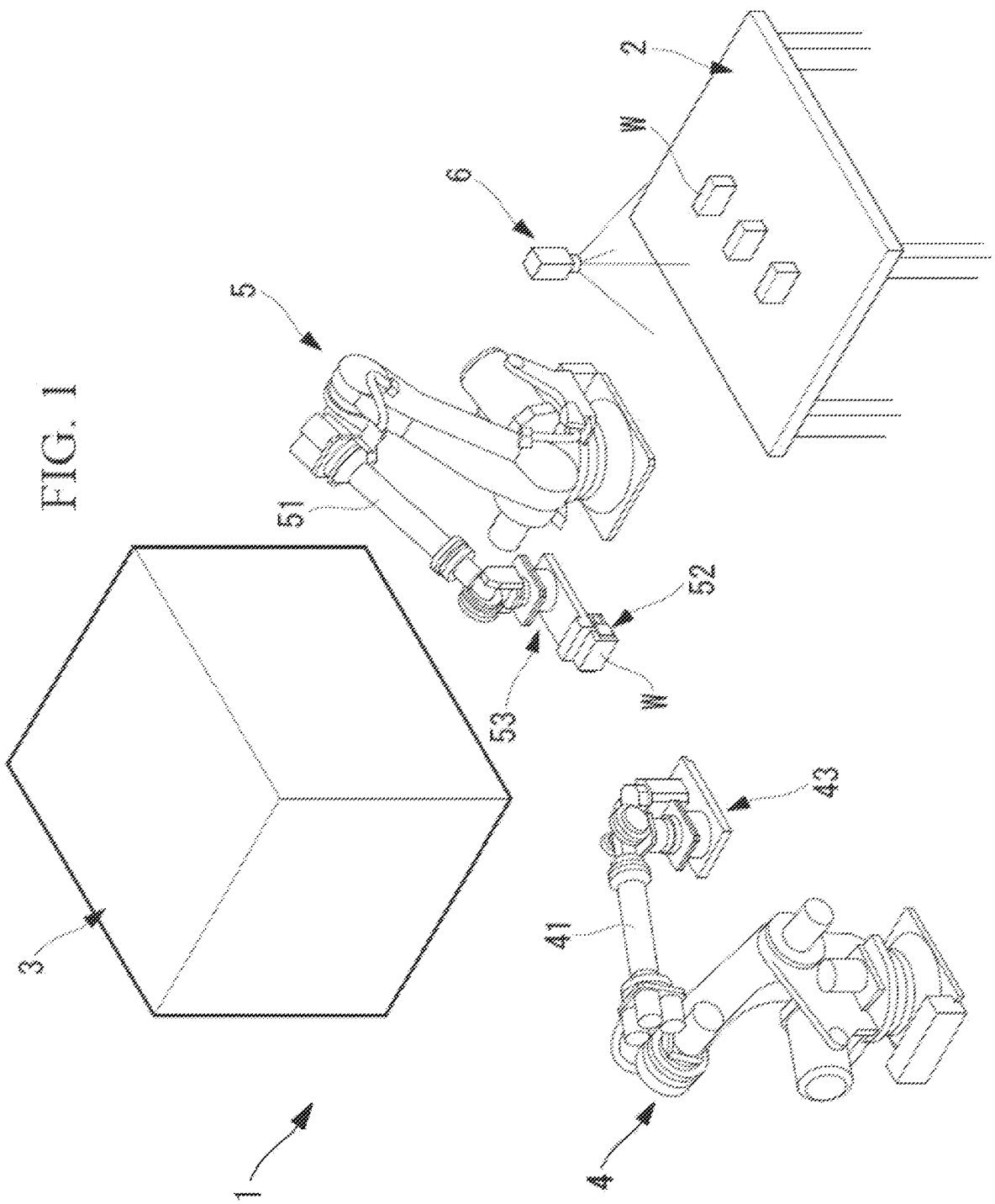
FIG. 1 is an overall configuration diagram showing a robot machining system according to an embodiment of the present invention.

The robot machining system 1 according to this embodiment is, for example, as shown in FIG. 1, a system for machining, in the middle of a path in which a workpiece W, e.g. a casting workpiece W, placed on a placement table 2 is handled and conveyed to a machine tool 3, a seating surface for installing the workpiece W on the machine tool 3.

The robot machining system 1 is provided with: the placement table 2 on which the workpiece W is placed; a first robot (machining device) 4 and a second robot (robot) 5; a control device (not shown) that controls the first robot 4 and the second robot 5; and the machine tool 3. A vision sensor 6 is disposed above the placement table 2, whereby it is possible to detect positions and orientations of a plurality of the workpieces W that are placed on the placement table 2.

The first robot 4 and the second robot 5 are vertical articulated robots and are respectively provided with ATCs (Auto Tool Changers) 43, 53 that are capable of changing and attaching various machining tools 42 and hands 52 at distal ends (arm ends) of arms 41, 51.

Figure 2:
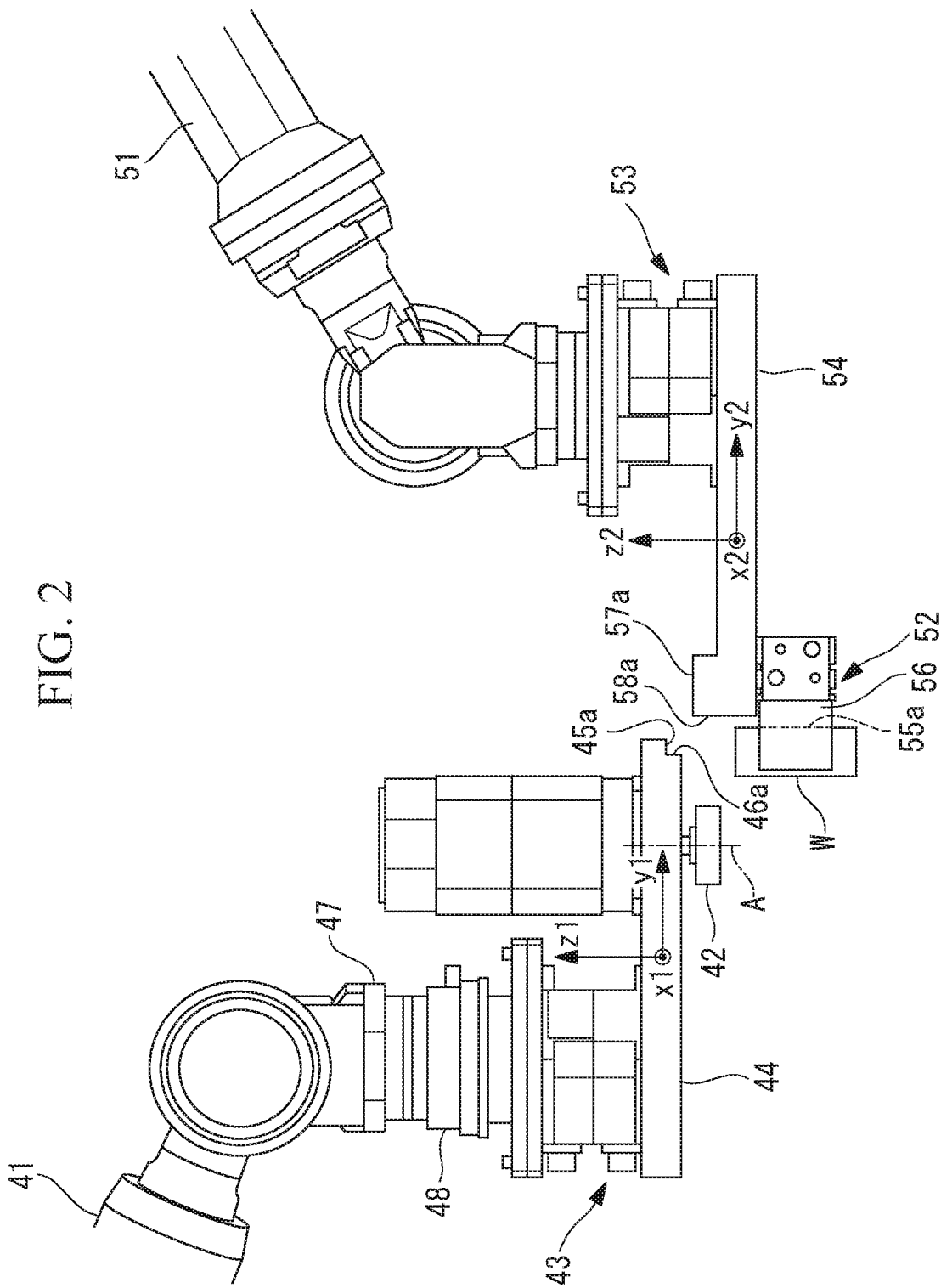
FIG. 2 is a partial side view showing a machining tool and a hand that holds a workpiece, which are provided at distal end portions of two robots provided in the robot machining system in FIG. 1.

As shown in FIG. 2, the first robot 4 holds the machining tool 42 by means of the ATC 43. In an example shown in FIG. 2, the machining tool 42 is, for example, a milling cutter that is rotationally driven by a motor, and is attached to a flat plate-shaped bracket 44 that is held by the ATC 43 in an attachable/detachable manner. As shown in FIG. 2, with reference to a tool coordinate system x1y1z1 fixed with respect to the bracket 44, a first flat surface (guide surface) 45a that is orthogonal to a rotation axis A and that extends in the x1y1 directions and a second flat surface 46a that is orthogonal to the first flat surface 45a and that extends in the x1z1 directions are provided at an edge of the bracket 44. The milling cutter 42 is rotationally driven about the rotation axis A, which is parallel to the z1 direction (first direction). Here, the y1 direction (second direction) is orthogonal to the z1 direction along the rotation axis A.

In addition, the first robot 4 is provided with a force sensor 48 between a wrist 47 at the distal end of the arm 41 and the ATC 43. The force sensor 48 is capable of detecting forces in three mutually orthogonal directions. For example, the force sensor 48 is capable of detecting respective forces in the x1, y1, and z1 directions.

The second robot 5 holds, by means of the ATC 53, the hand 52 that grips the workpiece W in an attachable/detachable manner. The hand 52 is attached to the distal end of a flat plate-shaped bracket 54 that is held by the ATC 53 in an attachable/detachable manner. The hand 52 is, for example, with reference to a tool coordinate system x2y2z2 fixed to the bracket 54, provided with: a pressing surface 55a against which one surface of the workpiece W is pressed in the y2 direction; and a pair of gripping pieces 56 that grip the workpiece W by being brought close to the workpiece W from both sides so as to sandwich the workpiece W in the x2 direction in a state in which the workpiece W is pressed against the pressing surface 55a.

As shown in FIG. 2, two flat surfaces (guided portions) 57a, 58a that extend in the x2 direction, which is parallel to a direction in which the workpiece W is machined by the machining tool 42, and that are orthogonal to each other are provided at an edge of the bracket 54.

The first robot 4 holding the machining tool 42 is disposed at a position where milling can be applied to the workpiece W, at an intermediate position in a path in which the workpiece W is conveyed from the placement table 2 to the machine tool 3 by the second robot 5 holding the workpiece W.

The control device controls the first robot 4 and the second robot 5, and also controls the first robot 4 on the basis of the magnitude of the force detected by the force sensor 48.

Figure 3:
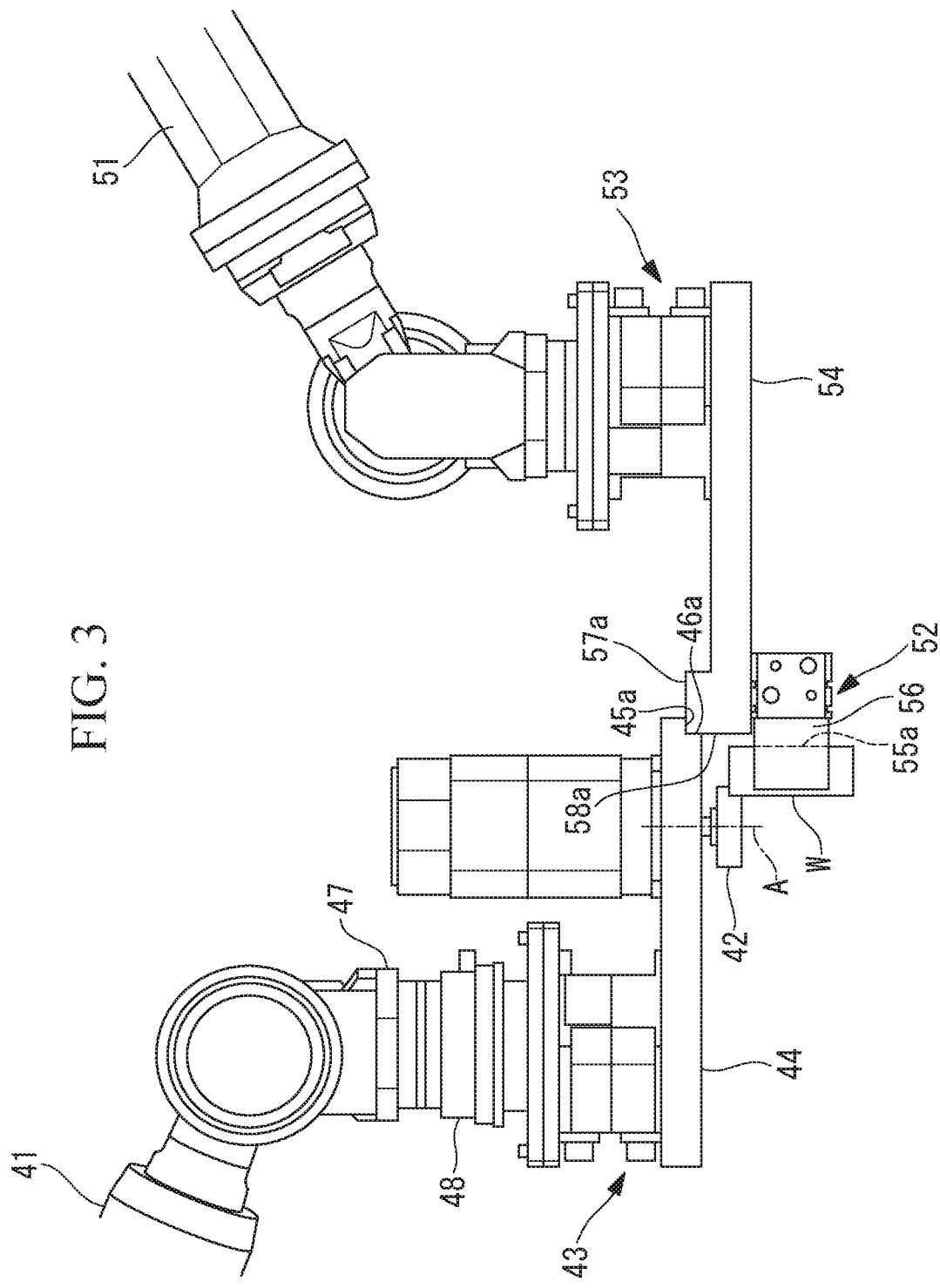
FIG. 3 is a partial side view for explaining a state in which the workpiece is machined by the machining tool of the robot machining system in FIG. 1.

Specifically, for example, after any one of the workpieces W on the placement table 2 is gripped by the hand 52 of the second robot 5, the control device fixes the second robot 5 in a state in which the second robot 5 has been moved to the orientation shown in FIG. 2, and, as shown in FIG. 3, operates the first robot 4 so as to be disposed at a position where the two flat surfaces 57a, 58a on the hand 52 side are simultaneously brought into close contact with the first flat surface 45a and the second flat surface 46a of the bracket 44 on the machining tool 42 side.

In this embodiment, the first flat surface 45a and the second flat surface 46a constituting the guide surfaces and the two flat surfaces 57a, 58a constituting the guided portions extend in the x1 direction and the x2 direction, respectively, and, in a state in which the guided portions 57a, 58a are abutted against the guide surfaces 45a, 46a before machining, a blade of the milling cutter 42 and the workpiece W are disposed with a displacement in the x1 direction.

Figure 4:
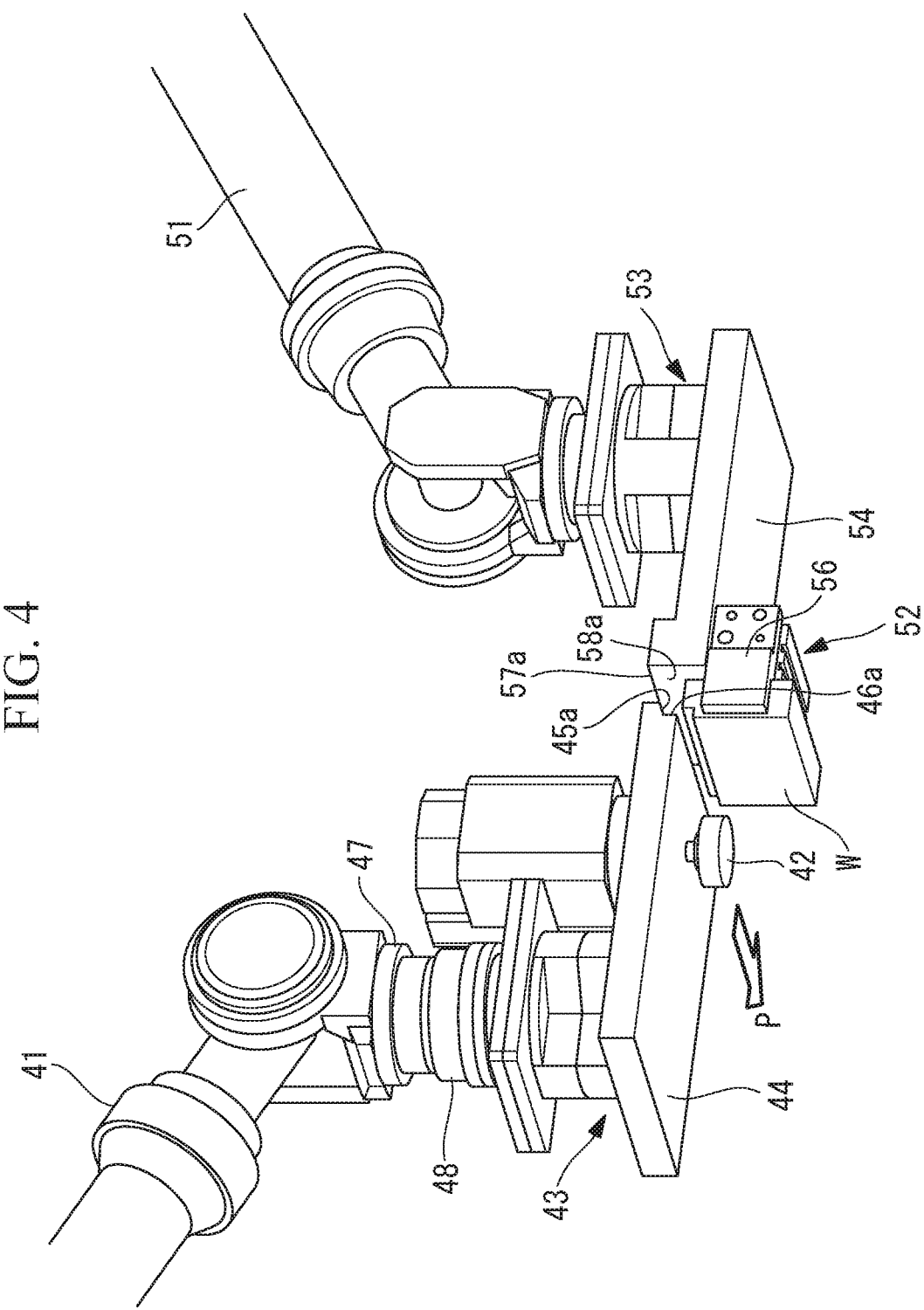
FIG. 4 is a partial perspective view for explaining the moving direction of the machining tool in the robot machining system in FIG. 1.

From this state, while the milling cutter 42 is rotationally driven by actuation of the motor, as indicated by an arrow P in FIG. 4, the first robot 4 is controlled such that the machining tool 42 is linearly moved in the x1 direction, and thus, the workpiece W is milled in a straight line along the x2 direction.

In this case, the control device controls the first robot 4 so as to be in the orientation in which, during machining of the workpiece W by the machining tool 42: the forces that are successively detected by the force sensor 48 are equal to or greater than a prescribed magnitude in the z1 direction and the y1 direction; and absolute values of moments about the x1-axis, y1-axis, and z1-axis are less than or equal to a prescribed threshold.

By doing so, milling is performed while maintaining the state in which the two flat surfaces 57a, 58a on the hand 52 side are simultaneously brought into close contact with the first flat surface 45a and the second flat surface 46a of the bracket 44 on the machining tool 42 side.

The operation of the thus-configured robot machining system 1 according to this embodiment will be described below.

To perform machining of a workpiece W by using the robot machining system 1 according to this embodiment, the control device, according to a taught program, causes the vision sensor 6 to capture an image of workpieces W that are randomly placed on the placement table 2, and by processing the acquired image, detects the position and the orientation of a workpiece W to be gripped.

After the position and the orientation of the workpiece W are detected, the control device controls the second robot 5 and operates the second robot 5 so as to be in the orientation for gripping the detected workpiece W with the hand 52 thereof. The control device causes the second robot 5 to move the hand 52 and to actuate the gripping pieces 56 in a state in which the workpiece W is pressed against the pressing surface 55a, thereby sandwiching the workpiece W between the gripping pieces 56.

In this state, the control device operates the second robot 5 and the first robot 4, and a seating surface is machined on the workpiece W by the machining tool 42 attached to the first robot 4.

In this case, the first robot 4 is brought close to the second robot 5, which is stopped at a prescribed position, and the two flat surfaces 57a, 58a that are provided on the bracket 54 on the hand 52 side are respectively brought into close contact with the first flat surface 45a and the second flat surface 46a that are provided on the bracket 44 on the machining tool 42 side.

In this state, the motor is actuated to rotate the milling cutter 42, and the first robot 4 is actuated to linearly move the machining tool 42 in the x1 direction. By doing so, milling of the workpiece W is performed by means of the blade of the milling cutter 42.

In this case, the control device controls the first robot 4 on the basis of the magnitude of the force detected by the force sensor 48. In other words, while the first robot 4 is maintained in the orientation in which the forces in the y1 direction and the z1 direction, which are detected by the force sensor 48, are equal to or greater than a prescribed magnitude and in which absolute values of moments about the x1-axis, y1-axis, and z1-axis are less than or equal to a prescribed threshold, the machining tool 42 is linearly moved in the x1 direction. By doing so, while the first flat surface 45a and the second flat surface 46a that are provided on the bracket 44 on the machining tool 42 side and the two flat surfaces 57a, 58a that are provided on the bracket 54 on the hand 52 side are maintained in a close contact state during machining, the machining tool 42 is moved in the x1 direction.

In other words, because the blade of the milling cutter 42 as well as the first flat surface 45a and the second flat surface 46a are disposed on the same brackets 44, 54, the dimensional precision is high, and the rigidity is also high in the brackets 44, 54. Therefore, by maintaining a state in which the first flat surface 45a and the second flat surface 46a are pressed against the two flat surfaces 57a, 58a of the bracket 54 on the hand 52 side from before machining to completion of machining of the workpiece W, it is possible to precisely keep the position of the blade of the milling cutter 42 with respect to the two flat surfaces 57a, 58a on the hand 52 side. As a result, there is an advantage in that, even if the orientations of the robots 4, 5 change during machining by using the robots 4, 5 having lower rigidity than the machine tool 3, the position of the blade of the milling cutter 42 with respect to the workpiece W does not vary except in the feed direction, and it is possible to precisely machine the seating surface.

In addition, because the ATC 43 is interposed in the first robot 4 to hold the machining tool 42 and the ATC 53 is interposed in the second robot 5 to hold the hand 52 with which the workpiece W is gripped, by appropriately adjusting the orientations of the first robot 4 and the second robot 5 and also by reholding the workpiece W with the hand 52, it is possible to apply various types of machining to the workpiece W. In addition, it is possible to perform various types of machining by changing the hand 52 or the machining tool 42 by means of the ATC 43, 53.

In addition, with the robot machining system 1 according to this embodiment, it is possible to machine, on a workpiece W placed on the placement table 2 and in the process of conveying the workpiece W to the machine tool 3, a seating surface for attaching the workpiece W to the machine tool 3. In other words, because machining is performed in a state in which the workpiece W is gripped by the hand 52 for conveyance, there is no need for labor such as a setup change of the machine tool 3, and thus, it is possible to quickly perform precision machining by the machine tool 3, thereby shortening the machining time.

Note that, although a case in which machining of a seating surface is performed on a workpiece W formed of a casting by means of the robots 4, 5 has been illustrated as an example in this embodiment, the present invention is not limited thereto. Any types of workpiece W and machining may be employed. In addition, any machining may be performed in the process of gripping the workpiece W and conveying the workpiece W to the machine tool 3, and deburring or the like may be performed in a conveying process in which the workpiece W is taken out from the machine tool 3 and delivered.

In addition, although the second robot 5 holding the workpiece W is fixed, and machining is performed while moving the machining tool 42 with respect to the workpiece W by operation of the first robot 4 holding the machining tool 42 in this embodiment, the first robot 4 holding the machining tool 42 may be fixed and machining may be performed by operating the second robot 5 holding the workpiece W.

Figure 5:
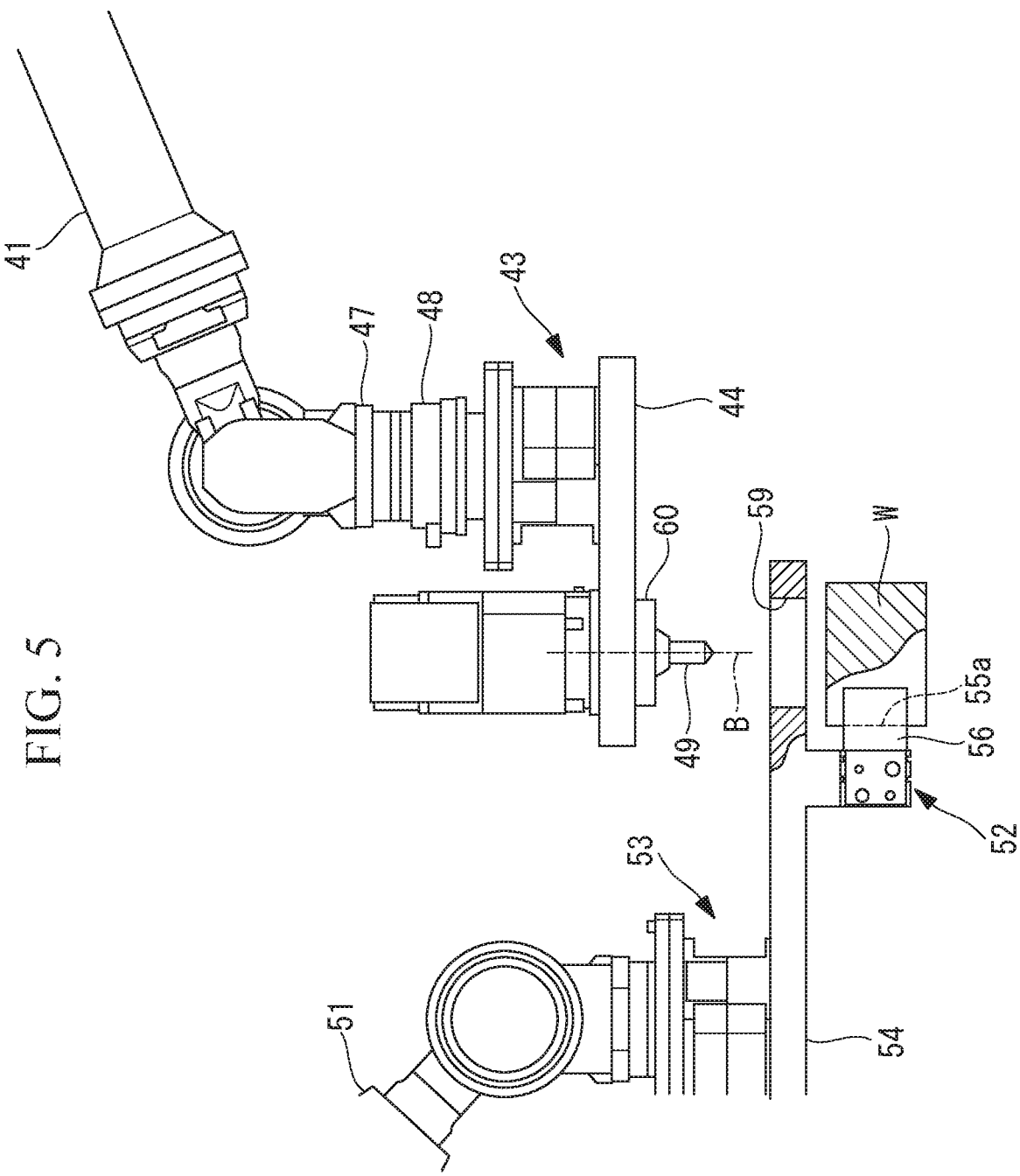
FIG. 5 is a partial side view showing a machining tool and a hand that holds a workpiece, which are provided at distal end portions of two robots provided in a modification of the robot machining system in FIG. 1.
Figure 6:
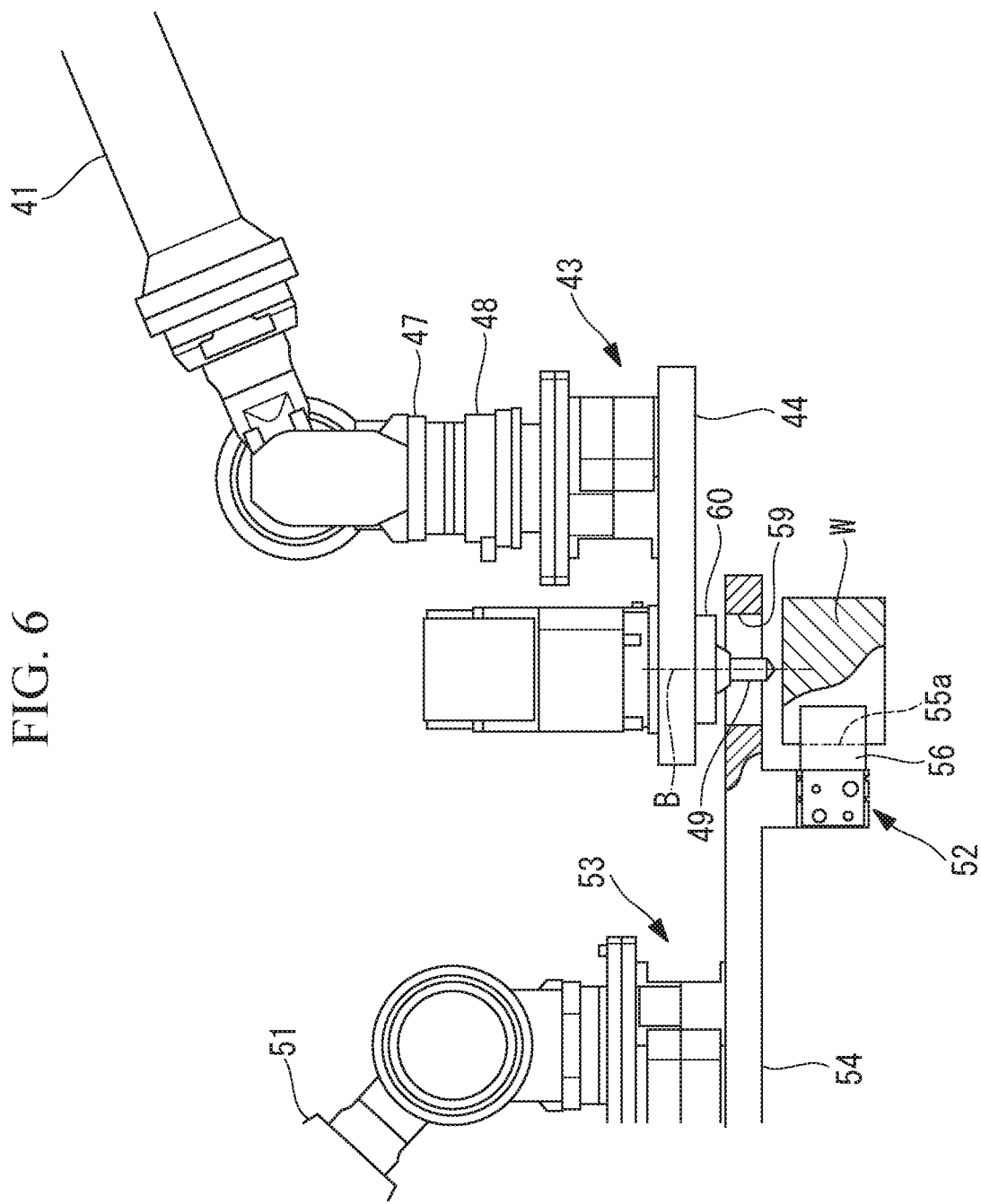
FIG. 6 is a partial side view for explaining a state immediately before the workpiece is machined by the machining tool of the robot machining system in FIG. 5.
Figure 7:
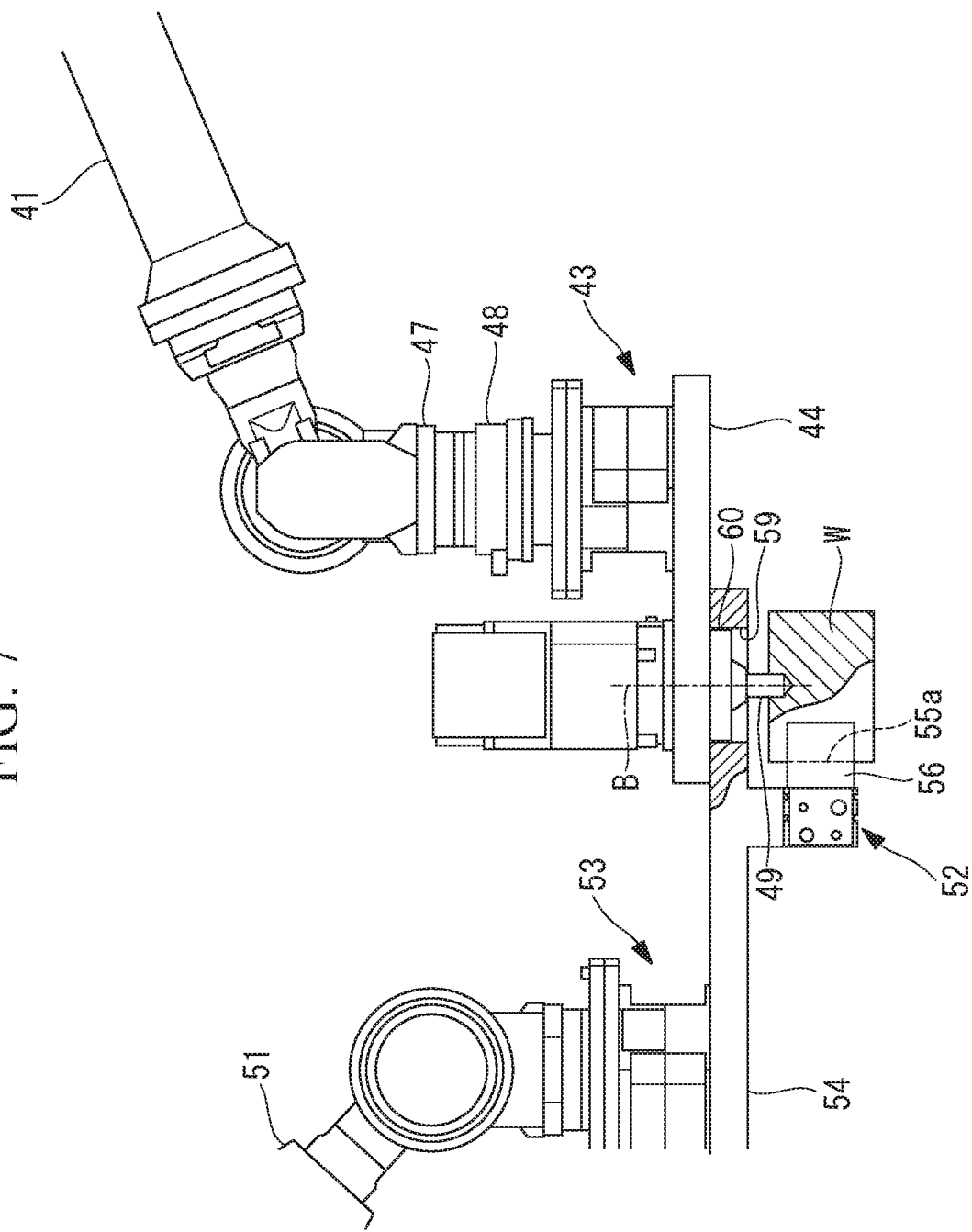
FIG. 7 is a partial side view for explaining a state at completion of machining of the workpiece by the machining tool of the robot machining system in FIG. 5.

In addition, although milling in which the milling cutter 42 is used as a machining tool has been illustrated as an example in this embodiment, alternatively, as shown in FIGS. 5 to 7, the present invention may be applied to drilling in which a drill 49 is used as a machining tool. In this case, as shown in FIGS. 6 and 7, a fitting hole (hole) 59 having a circular cross section and through which a blade of the drill 49 penetrates may be provided in the bracket 54 of the hand 52 gripping the workpiece W, a columnar boss (columnar portion) 60 centered on a rotation axis B of the drill 49 may be provided on the bracket 44 on the machining tool 49 side, and the inner circumferential surface of the fitting hole 59 and the outer circumferential surface of the boss 60 may serve as a guide surface and a guided portion, respectively.

As shown in FIG. 7, by fitting the boss 60 into the fitting hole 59 when performing drilling with the drill 49, it is possible to perform drilling on the workpiece W by moving the drill 49 in a direction along the rotation axis B while the outer circumferential surface of the boss 60 is brought into close contact with the inner circumferential surface of the fitting hole 59. In other words, because the drill 49 and the workpiece W are maintained in a precisely aligned state when performing drilling with the drill 49, it is possible to precisely perform machining. In addition, by machining to a position where the bracket 44 on the machining tool 49 side abuts the bracket 54 on the hand 52 side, it is possible to precisely achieve a desired hole depth.

In addition, although the force sensor 48 is provided in the first robot 4 holding the machining tool 42, and the first robot 4 is controlled on the basis of the force detected by the force sensor 48 in this embodiment, alternatively, the second robot 5 may be controlled on the basis of the force detected by the force sensor 48 provided in the first robot 4. In addition, the force sensor 48 may be provided in the second robot 5 holding the workpiece W and the second robot 5 or the first robot 4 may be controlled on the basis of the detected force.

In addition, both the first robot 4 and the second robot 5 may be provided with the force sensors 48.

In addition, although a case in which the first robot 4 holds the machining tool 42, the second robot 5 holds the workpiece W, and the workpiece W is machined between the two robots 4, 5 has been illustrated as an example in this embodiment, alternatively, the first robot 4 holding the machining tool 42 may be replaced with an installed-type machining device. In this case, machining may be performed while the second robot 5 holding the workpiece W moves the workpiece W with respect to the machining device.

As a result, the above-described embodiment leads to the following aspect.

An aspect of the present invention is a robot machining system including: a robot in which a hand that grips a workpiece is attached to an arm end thereof; a machining device that rotationally drives a machining tool; a force sensor that is provided in at least one of the robot and the machining device and that detects a force acting between the robot and the machining device when the workpiece is being machined by the machining tool; and a control device that controls at least one of the robot and the machining device in accordance with the force detected by the force sensor, wherein one of the machining device and the hand is provided with guide surfaces that extend along a direction in which the machining device and the hand are relatively moved when the workpiece is machined by the machining tool, wherein the other of the machining device and the hand is provided with guided portions that are brought into contact with the guide surfaces when the workpiece is machined by the machining tool, and wherein the control device performs control for maintaining a contact state between the guide surfaces and the guided portions during machining of the workpiece by the machining tool.

With this aspect, by actuation of the robot, the workpiece gripped by the hand at the arm end is brought close to the machining tool of the machining device, and when machining of the workpiece by the machining tool is started, the guided portions provided in one of the machining device and the hand are brought into contact with the guide surfaces provided in the other of the machining device and the hand. By doing so, a force due to contacts between the guide surfaces and the guided portions acts between the robot and the machining device, and is detected by the force sensor provided in at least one of the robot and the machining device.

Then, the control device controls at least one of the machining device and the robot on the basis of the detected force, whereby the contact state between the guide surfaces and the guided portions is maintained during machining. By doing so, the relative positions of the hand and the machining tool are maintained in a prescribed positional relationship by means of contacts between the guide surfaces and the guided portions, and thus, it is possible to precisely machine the workpiece into a shape defined by the guide surfaces.

In other words, even when the force that the workpiece receives from the machining tool fluctuates in a state in which the workpiece is supported by the robot having low rigidity, by maintaining contacts between the guide surfaces and the guided portions, it is possible to stably maintain the positional relationship between the machining tool and the workpiece, thereby enhancing the machining precision. By doing so, it is possible to enhance the workpiece machining precision while enhancing the machining flexibility by using the robot.

In the abovementioned aspect, the machining device may be another robot in which the machining tool is attached to the arm end thereof.

With this configuration, by using the robot also as the machining device, it becomes possible to change the position and the orientation of the machining tool, thereby enhancing the machining flexibility, while it is possible to compensate for a further decrease in the rigidity by maintaining the contact state between the guide surfaces and the guided portions, thereby enhancing the machining precision.

In addition, in the abovementioned aspect, the machining tool may be a milling cutter; and the guide surfaces may be two mutually orthogonal surfaces against which the guided portions are abutted in a first direction along a rotation axis of the milling cutter and a second direction orthogonal to the first direction.

With this configuration, the relative movements of the workpiece and the machining tool in the first direction along the rotation axis of the milling cutter and in the second direction orthogonal thereto are restricted by means of contact between the guide surfaces and the guided portions, and the relative movements of the workpiece and the machining tool along the guide surfaces in the direction orthogonal to the first direction and the second direction are permitted.

In other words, by restricting the relative movements of the workpiece and the machining tool in the first direction along the rotation axis of the milling cutter and in the second direction orthogonal thereto, it is possible to precisely perform milling in the direction along the guide surfaces while limiting the cutting depths in the two directions, made by the milling cutter.

In addition, in the abovementioned aspect, the machining tool may be a drill; the guide surface may be an inner circumferential surface of a hole that extends in a direction along a rotation axis of the drill; and the guided portion may be an outer circumferential surface of a columnar portion having a shape that fits into the hole.

With this configuration, when performing machining with the drill, the columnar portion provided in one of the machining device and the hand is fitted into the hole provided in the other, whereby the relative movements of the drill and the workpiece in the direction along the rotation axis of the drill are precisely guided by maintaining the contact state between the inner circumferential surface of the hole and the outer circumferential surface of the columnar portion, and thus, it is possible to precisely perform drilling.

In addition, in the abovementioned aspect, the guide surfaces and the guided portions may have shapes that allow contact therebetween from before machining to completion of machining of the workpiece by the machining tool.

The present invention affords an advantage in that it is possible to precisely position a workpiece held by a robot with respect to a tool and to precisely machine the workpiece.

The invention claimed is:

1. A robot machining system, comprising:
a first multi-axis robot, wherein the first multi-axis robot is defined as a robot comprising a first plurality of joints and configured to change a position or posture of a first arm end of the first multi-axis robot by driving the first plurality of joints;
a second multi-axis robot, wherein the second multi-axis robot is defined as a robot comprising a second plurality of joints and configured to change a position or posture of a second arm end of the second multi-axis robot by driving the second plurality of joints;
a first auto tool changer attached to the first arm end, wherein the first arm end is movable about an x-axis, a y-axis, and a z-axis;
a second auto tool changer attached to the second arm end, wherein the second arm end is movable about the x-axis, the y-axis, and the z-axis;
a machining tool disposed on the first auto tool changer, wherein the machining tool is rotationally driven about a rotation axis parallel to the z-axis;
a hand attached to the second auto tool changer, wherein the hand is adapted to grip a workpiece;
a force sensor disposed in at least one of the first robot and the second robot, wherein the force sensor detects a force, in at least one of three mutually orthogonal directions, acting between the first robot and the second robot when the workpiece is being machined by the machining tool; and
a controller that controls at least one of the first robot and the second robot in accordance with the force detected by the force sensor,
wherein one of the first auto tool changer and the second auto tool changer is provided with guide surfaces that extend along a direction in which the first auto tool changer and the second auto tool changer are relatively moved when the workpiece is machined by the machining tool,
wherein the other of the first auto tool changer and the second auto tool changer is provided with guided portions that are brought into contact with the guide surfaces when the workpiece is machined by the machining tool, and
wherein the controller maintains a contact state between the guide surfaces and the guided portions during machining of the workpiece by the machining tool in a feed direction, and
wherein each of the first multi-axis robot and the second multi-axis robot is a vertical articulated robot.

2. The robot machining system according to claim 1, wherein:
the machining tool comprises a milling cutter; and
the guide surfaces are two mutually orthogonal surfaces against which the guided portions are abutted in a first direction along a rotation axis of the milling cutter and a second direction orthogonal to the first direction.

3. The robot machining system according to claim 1, wherein:
the machining tool comprises a drill;
the guide surface is an inner circumferential surface of a hole that extends in a direction along a rotation axis of the drill; and
the guided portion is an outer circumferential surface of a columnar portion having a shape that fits into the hole.

4. The robot machining system according to claim 1, wherein the guide surfaces and the guided portions have shapes that allow contact therebetween from before machining to completion of machining of the workpiece by the machining tool.

5. The robot machining system according to claim 1, wherein the guided portions move with respect to the guide surfaces in the direction by the first auto tool changer and the second auto tool changer being relatively moved.

6. The robot machining system according to claim 1, wherein a state of contact between the guide surfaces and the guided portions, which relatively move with respect to each other in the direction, is maintained in accordance with the force detected by the force sensor.

7. The robot machining system according to claim 1, wherein the force sensor detects forces in three mutually orthogonal directions.

8. The robot machining system according to claim 1, further comprising:
a vision sensor to detect a position and orientation of the workpiece, permitting the hand to grip the workpiece.

9. A robot machining system, comprising:
a first multi-axis robot, wherein the first multi-axis robot is defined as a vertical articulated robot comprising a first plurality of joints and configured to change a position or posture of a first end of the first multi-axis robot by driving the first plurality of joints, and wherein the first end is movable about an x-axis, a y-axis, and a z-axis;
a first auto tool changer attached at the first end;
a rotationally driven machining tool disposed on the first auto tool changer, wherein the machining tool is rotationally driven about a rotation axis parallel to the z-axis;
a second multi-axis robot, wherein the second multi-axis robot is defined as a robot comprising a second plurality of joints and configured to change a position or posture of a second end of the second multi-axis robot by driving the second plurality of joints, and wherein the second end is movable about the x-axis, the y-axis, and the z-axis;
a second auto tool changer attached at the second end;
a hand attached to the second auto tool changer, wherein the hand is adapted to grip a workpiece;
at least one guide surface disposed on the first auto tool changer adjacent to the machining tool;
at least one guided portion disposed on the second auto tool changer adjacent to the hand, wherein the at least one guided portion contacts the at least one guide surface when the workpiece is machined by the machining tool;
a force sensor disposed on at least one of the first robot and the second robot, wherein the force sensor detects forces between the first robot and the second robot in at least a y-direction and a z-direction when the workpiece is being machined; and
a controller that controls the first robot and the second robot, wherein the controller maintains contact between the at least one guide surface and the at least one guided portion during machining of the workpiece by the machining tool in a feed direction, and wherein the controller controls the first robot into an orientation where successively detected forces between the first robot and the second robot are equal to or greater than a predetermined magnitude in the z-direction and in the y-direction, and wherein absolute values of moments about the x-axis, the y-axis, and the z-axis are less than to equal to a predetermined threshold,
wherein each of the first multi-axis robot and the second multi-axis robot is a vertical articulated robot.

10. The robot machining system according to claim 9, wherein the force sensor also detects forces between the first robot and the second robot in an x-direction when the workpiece is being machined.

11. The robot machining system according to claim 9, wherein:
the machining tool comprises a milling cutter; and
the at least one guide surface comprises two mutually orthogonal surfaces against which the at least one guided portion is abutted, one of the two mutually orthogonal surfaces being in a first direction along a rotation axis of the milling cutter.

12. The robot machining system according to claim 9, wherein:
the machining tool comprises a drill with a rotation axis;
the at least one guide surface is an inner circumferential surface of a hole that extends in a direction along the rotation axis of the drill; and
the at least one guided portion is an outer circumferential surface of a columnar portion with a shape that fits into the hole.

13. The robot machining system according to claim 9, wherein the at least one guide surface and the at least one guided portion are shaped to facilitate contact therebetween at least before and during machining of the workpiece by the machining tool.

14. The robot machining system according to claim 9, wherein the at least one guided portion is movable with respect to the at least one guide surface.

15. The robot machining system according to claim 9, further comprising:
a vision sensor to detect a position and orientation of the workpiece, permitting the hand to grip the workpiece.

* * * * *